(12) United States Patent
Novoselov et al.

(10) Patent No.: US 9,508,308 B1
(45) Date of Patent: Nov. 29, 2016

(54) DISPLAY DEVICE CONTROL METHOD

(71) Applicant: Amazon Technologies, Inc., Seattle, WA (US)

(72) Inventors: Pavel Novoselov, Eindhoven (NL); Jozef Elisabeth Aubert, Roermond (NL)

(73) Assignee: Amazon Technologies, Inc., Seattle, WA (US)

( * ) Notice: Subject to any disclaimer, the term of this patent is extended or adjusted under 35 U.S.C. 154(b) by 131 days.

(21) Appl. No.: 14/319,820

(22) Filed: Jun. 30, 2014

(51) Int. Cl.
| | |
|---|---|
| *G09G 3/20* | (2006.01) |
| *G09G 5/00* | (2006.01) |
| *G09G 3/36* | (2006.01) |
| *G02B 26/00* | (2006.01) |
| *G09G 3/34* | (2006.01) |

(52) U.S. Cl.
CPC ............... *G09G 5/00* (2013.01); *G02B 26/005* (2013.01); *G09G 3/348* (2013.01); *G09G 3/3696* (2013.01); *G09G 2310/06* (2013.01)

(58) Field of Classification Search
CPC ...................................................... G09G 5/00
USPC ............................................................ 345/55
See application file for complete search history.

(56) References Cited

U.S. PATENT DOCUMENTS

| | | | | |
|---|---|---|---|---|
| 2009/0033641 | A1* | 2/2009 | Yamazaki ............ | G09G 3/3674 345/204 |
| 2013/0271357 | A1* | 10/2013 | Wang .................. | G09G 3/3677 345/92 |

OTHER PUBLICATIONS

Roy Van Dijk, et al., "Electrowetting System and Method for Operating", U.S. Appl. No. 12/646,047, filed Dec. 23, 2009.

* cited by examiner

*Primary Examiner* — Jason Olson
(74) *Attorney, Agent, or Firm* — EIP US LLP

(57) ABSTRACT

The patent application relates to a method of controlling a display device including display elements arranged in a matrix with n rows of display elements. The method includes: driving a first row of display elements, with a first output of a driving system being connected to the first row and disconnected from at least one further row of display elements.

20 Claims, 8 Drawing Sheets

DISPLAY DEVICE CONTROL METHOD

BACKGROUND

Display devices, for example electrowetting display devices, are known. Display elements of such a display device may be arranged in rows in an active matrix configuration. To drive each display element to provide a desired display effect, a voltage corresponding to the desired display effect may be applied to each display element. In examples, the voltage may be applied to a display element by a column driver in coordination with a row driver switching a switching element associated with the display element so that the voltage may be applied to the display element. In the active matrix configuration, there is therefore a matrix of electrical connections, i.e. lines, including column lines and row lines, for applying the voltage to the display elements.

It has been observed that a parasitic capacitance effect may occur between a column line and a row line. This can increase the power requirements for driving a display element.

It is desirable to reduce power requirements for driving a display device.

DETAILED DESCRIPTION

Figure 1:
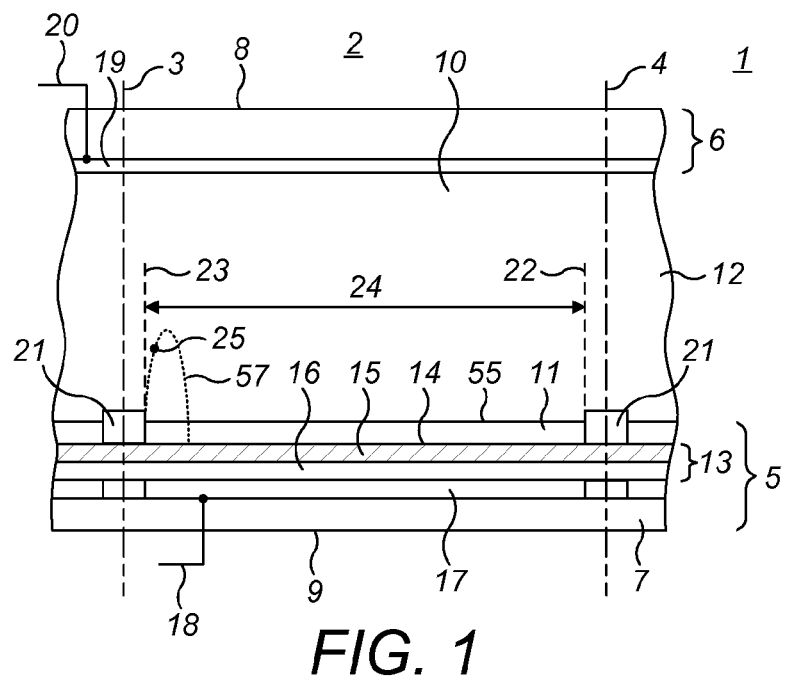
FIG. 1 shows schematically an example display element.

FIG. 1 shows a diagrammatic cross-section of part of an example of an electrowetting display device 1, including a plurality of picture elements or display elements 2, one of which is shown in the Figure and which may also be referred to as an electrowetting cell. The lateral extent of the display element is indicated in the Figure by two dashed lines 3, 4. The display elements comprise a first support plate 5 and a second support plate 6. The support plates may be separate parts of each display element, but the support plates may be shared in common by the plurality of display elements. The support plates may include a glass or polymer substrate 6, 7 and may be rigid or flexible.

The display device has a viewing side 8 on which an image or display formed by the display device can be viewed and a rear side 9. In the Figure a surface of the first support plate 5, which surface is in this example a surface of the substrate 7, defines the rear side 9; a surface of the second support plate 6, which surface is in this example a surface of the substrate 6, defines the viewing side; alternatively, in other examples, a surface of the first support plate may define the viewing side. The display device may be of the reflective, transmissive or transflective type. The display device may be an active matrix driven display device. The plurality of display elements may be monochrome. For a color display device the display elements may be divided in groups, each group having a different color; alternatively, an individual display element may be able to show different colors.

A space 10 of each display element between the support plates is filled with two fluids: a first fluid 11 and a second fluid 12 at least one of which may be a liquid. The second fluid is immiscible with the first fluid. Therefore, the first fluid and the second fluid do not substantially mix with each other and in some examples do not mix with each other to any degree. The immiscibility of the first and second fluids is due to the properties of the first and second fluids, for example their chemical compositions; the first and second fluids tend to remain separated from each other, therefore tending not to mix together to form a homogeneous mixture of the first and second fluids. Due to this immiscibility, the first and second fluids meet each other at an interface which defines a boundary between the volume of the first fluid and the volume of the second fluid; this interface or boundary may be referred to as a meniscus. With the first and second fluids substantially not mixing with each other, it is envisaged in some examples that there may be some degree of mixing of the first and second fluids, but that this is considered negligible in that the majority of the volume of first fluid is not mixed with the majority of the volume of the second fluid.

The second fluid is electrically conductive or polar and may be water, or a salt solution such as a solution of potassium chloride in water. The second fluid may be transparent; it may instead be colored, white, absorbing or reflecting. The first fluid is electrically non-conductive and may for instance be an alkane like hexadecane or may be an oil such as silicone oil.

The first fluid may absorb at least a part of the optical spectrum. The first fluid may be transmissive for a part of the optical spectrum, forming a color filter. For this purpose the first fluid may be colored by addition of pigment particles or a dye. Alternatively, the first fluid may be black, i.e. absorb substantially all parts of the optical spectrum, or reflecting. A reflective first fluid may reflect the entire visible spectrum, making the layer appear white, or part of it, making it have a color.

The support plate 5 includes an insulating layer 13. The insulating layer may be transparent or reflective. The insulating layer 13 may extend between walls of a display element. To avoid short circuits between the second fluid 12 and electrodes arranged under the insulating layer, layers of the insulating layer may extend uninterrupted over a plurality of display elements 2, as shown in the Figure. The insulating layer has a surface 14 facing the space 10 of the display element 2. In this example the surface 14 is hydrophobic. The thickness of the insulating layer may be less than 2 micrometers and may be less than 1 micrometer.

The insulating layer may be a hydrophobic layer; alternatively, it may include a hydrophobic layer 15 and a barrier layer 16 with predetermined dielectric properties, the hydrophobic layer 15 facing the space 10, as shown in the Figure. The hydrophobic layer is schematically illustrated in FIG. 1 and may be formed of Teflon® AF1600. The barrier layer 16 may have a thickness, taken in a direction perpendicular the plane of the substrate, between 50 nanometers and 500 nanometers and may be made of an inorganic material like silicon oxide or silicon nitride or a stack of these (for example, silicon oxide-silicon nitride-silicon oxide) or an organic material like polyimide or parylene.

The hydrophobic character of the surface 14 causes the first fluid 11 to adhere preferentially to the insulating layer 13, since the first fluid has a higher wettability with respect to the surface of the insulating layer 13 than the second fluid 12. Wettability relates to the relative affinity of a fluid for the surface of a solid. Wettability may be measured by the contact angle between the fluid and the surface of the solid. The contact angle is determined by the difference in surface tension between the fluid and the solid at the fluid-solid boundary. For example, a high difference in surface tension can indicate hydrophobic properties.

Each display element 2 includes a first electrode 17 as part of the support plate 5. In examples shown there is one such electrode 17 per element. The electrode 17 is electrically insulated from the first and second fluids by the insulating layer 13; electrodes of neighboring display elements are separated by a non-conducting layer. In some examples, further layers may be arranged between the insulating layer 13 and the electrode 17. The electrode 17 can be of any desired shape or form. The electrode 17 of a display element is supplied with voltage signals by a signal line 18, schematically indicated in the Figure.

The support plate 6 includes a second electrode 19, which may extend between walls of a display element or extend uninterruptedly over a plurality of display elements 2, as shown in the Figure. The electrode 19 is in electrical contact with the conductive second fluid 12 and is common to all display elements. The electrode may be made of for example the transparent conductive material indium tin oxide (ITO). A second signal line 20 is connected to the electrode 19. Alternatively, the electrode may be arranged at a border of the support plates, where it is in electrical contact with the second fluid. This electrode may be common to all elements, when they are fluidly interconnected by and share the second fluid, uninterrupted by walls. The display element 2 can be controlled by a voltage V applied between the signal lines 18 and 20. The signal line 18 can be coupled to a matrix of control lines on the substrate 7. The signal line 20 is coupled to a display driving system.

The first fluid 11 in this example is confined to one display element by walls 21 that follow the cross-section of the display element. The cross-section of a display element may have any shape; when the display elements are arranged in a matrix form, the cross-section is usually square or rectangular. Although the walls are shown as structures protruding from the insulating layer 13, they may instead be a surface layer of the support plate that repels the first fluid, such as a hydrophilic or less hydrophobic layer. The walls may extend from the first to the second support plate but may instead extend partly from the first support plate to the second support plate as shown in FIG. 1. The extent of the display element, indicated by the dashed lines 3 and 4, is defined by the center of the walls 21. The area of the surface 14 between the walls of a display element, indicated by the dashed lines 22 and 23, is called the display area 24, over which a display effect occurs. The display effect depends on an extent that the first and second fluids adjoin the surface defined by the display area, in dependence on the magnitude of the applied voltage V described above. The magnitude of the applied voltage V therefore determines the configuration of the first and second fluids within the electrowetting element. In other words, the display effect depends on the configuration of the first and second fluid in the display element, which configuration depends on the magnitude of the voltage applied to the electrodes of the display element.

The display effect gives rise to a display state of the display element for an observer looking at the display device. When switching the electrowetting element from one fluid configuration to a different fluid configuration the extent of second fluid adjoining the display area surface may increase or decrease, with the extent of first fluid adjoining the display area surface decreasing or increasing, respectively.

Figure 2:
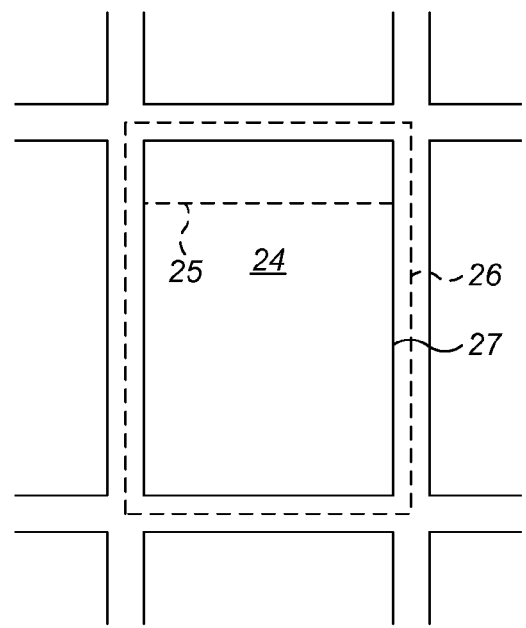
FIG. 2 shows a plan view of the example display element.

FIG. 2 shows a matrix of rectangular picture elements in a plan view of the hydrophobic surface 14 of the first support plate. The extent of the central picture element in FIG. 2, corresponding to the dashed lines 3 and 4 in FIG. 1, is indicated by the dashed line 26. Line 27 indicates the inner border of a wall; the line is also the edge of the display area 23.

When a zero or substantially zero voltage is applied between the electrodes 17 and 19, i.e. when the electrowetting element is in an off state, the first fluid 11 forms a layer between the walls 21, as shown in the FIG. 1. Application of a voltage will contract the first fluid, for example against a wall as shown by the dashed shape 25 in FIG. 1 or FIG. 2. The controllable shape of the first fluid, in dependence on the magnitude of applied voltage, is used to operate the picture element as a light valve, providing a display effect over the display area 23. For example, switching the fluids to increase adjoinment of the second fluid with the display area may increase the brightness of the display effect provided by the element.

This display effect determines the display state an observer will see when looking towards the viewing side of the display device. The display state can be from black to white with any intermediate grey state; in a color display device, the display state may also include color.

Figure 3:
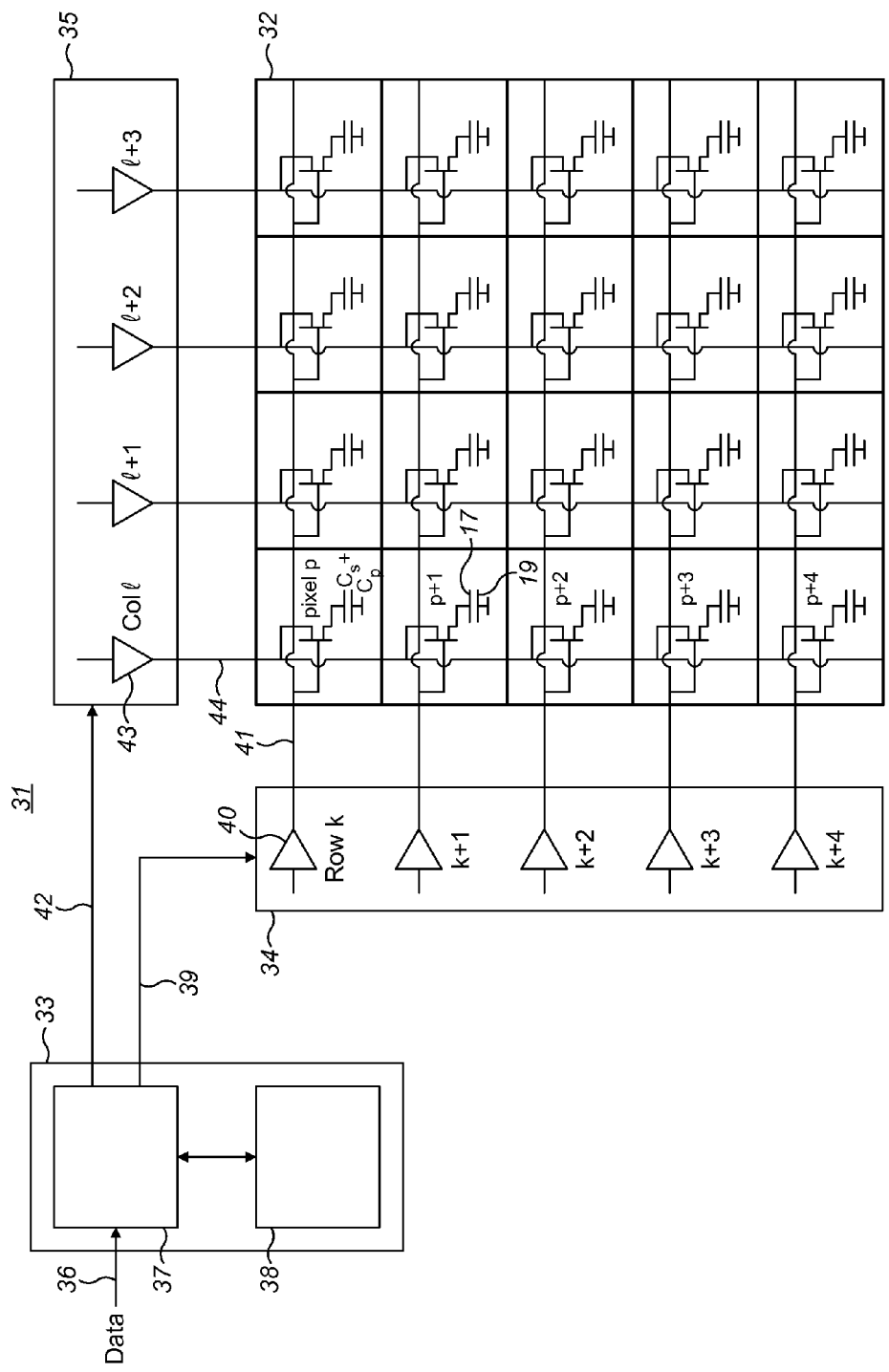
FIG. 3 shows schematically features of a known display device.

FIG. 3 shows schematically features of an example of a known electrowetting display apparatus 31. In this example of a so-called active matrix drive type the display apparatus includes a display driving system and a display device 32. The display driving system includes a display controller or controller 33, a display row driver 34 and a display column driver 35. Data indicative of display states of the display elements, the display states for example representing at least part of a still image or video image, is received via an input line 36 to the display driving system. The display controller includes a processor 37 for processing the data entered via the input line 36. The processor is connected to at least one memory 38. The display controller prepares the data for use in the display device.

The at least one memory may store computer program instructions that are configured to cause the display apparatus to perform one or more of the methods of controlling a display device as described herein when being executed by the processor. The computer program instructions may be stored on a computer program product including a non-transitory computer-readable storage medium.

An output of the processor 37 is connected by line 39 to the display row driver 34, which includes row driver stages 40 that transform signals to the appropriate voltages for the display device 32. Row signal lines 41 connect the row driver stages to respective rows of the display device 32 for transmitting the voltage pulses generated in the display row driver to display elements in each row of the display device, thereby providing a row addressing signal to each row of the display device. In other words, one or more voltage pulses for addressing one or more rows is transmitted over the row signal lines 41 corresponding to the rows to switching elements corresponding, i.e. associated, respectively to the display elements in the one or more rows. The display row driver 34 generates the voltage pulses used for addressing the rows of the display device, using information from the processor 37 to set a value of the pulse duration of the voltage pulses.

Another output of the processor 37 is connected by line 42 to the display column driver 35, which includes column driver stages 43 that transform signals to the appropriate voltages for the display device 32. Column signal lines 44 connect the column driver stages to the columns of the display device 32, providing a column signal to each column of the display device.

The display controller 33 determines which rows are selected for addressing and in which order. The selected rows may be consecutively addressed by applying an addressing signal, in the form of at least one voltage pulse, to each of these rows. In examples where the display elements of a row are connected to the same row signal line, addressing a row means addressing each display element of that row. When a display element is being addressed, the display element admits the column signal that is applied to the column signal line to which the display element is connected. The column signal for a display element is applied substantially simultaneously with the voltage pulse used for addressing the display element. Substantially simultaneously means that the column signal is present on the column signal line for at least the duration of the voltage pulse.

The display drivers may comprise a distributor, not shown in FIG. 3, for distributing data input to the display driver over a plurality of outputs connected to the driver stages. The distributor may be a shift register, which may be considered a memory. FIG. 3 shows the signal lines only for those columns and rows of the display device that are shown in the Figure. The row drivers may be integrated in a single integrated circuit. Similarly, the column drivers may be integrated in a single integrated circuit. The integrated circuit may include the complete driver assembly. The integrated circuit may be integrated on the support plate 5 or 6 of the display device. The integrated circuit may include the entire display driving system. Such an arrangement may be known as a "chip on glass" (COG) construction. In other examples a "chip on foil" (COF) construction may be used, where the column and/or row divers may be integrated on a foil rather than on the support plate 5 or 6, which foil is connectable to circuit lines of the support plate for driving the picture elements.

The display device 32 comprises a plurality of display elements arranged in a matrix of n rows, where n may be >2, i.e. larger than one, with m columns of the matrix, where m may be >2. The matrix may have an active matrix configuration. The total number of display elements in this example is n×m. FIG. 3 shows display elements for five rows, labelled k to k+4 and four columns labelled l to l+3. The total number of rows and columns for common display devices may range between a few hundred and a few thousand. The display elements, also called pixels, of column 1 are labelled p to p+4. Each display element may have the same construction as the display element 2 in FIG. 1.

FIG. 3 shows electrical elements of the display elements. Each display element of the display device 32 includes an active element in the form of one or more switching elements. The switching element may be a transistor, for example a thin-film transistor (TFT), or a diode. The electrodes of the display element are indicated as a pixel capacitor Cp formed by electrodes 17 and 19. A line connecting the electrode 19 of the capacitor to ground is the common signal line 20 and the line connecting the electrode 17 of the capacitor to the transistor is the signal line 18 shown in FIG. 1. The display element may include an optional capacitor Cs for storage purposes or for making the duration of the holding state or the voltage applied to the element uniform across the display device. This capacitor is arranged in parallel with Cp and is not separately shown in FIG. 3. The column drivers provide the signal levels corresponding to the input data for the display elements. The row drivers provide the signals for addressing the row of which the elements are to be set in a specific display state. In examples, addressing a row means applying a signal on the signal line of the row that switches a transistor of each of the display elements of the row to a conducting state of the transistor. Each row of the n rows of the display device is addressable by a signal such as a voltage pulse; the voltage pulse is applied to a switching element of each of the display elements in the addressed row for switching the switching element.

The addressing of rows is part of the addressing of display elements in an active matrix display device. A specific display element is addressed by: applying a voltage to the column in which the specific display element is located, thereby driving the column and the specific display element by applying the voltage to the specific display element; and applying a voltage pulse to the row in which the specific display element is located, thereby driving the row and in particular examples a switching element such as a transistor of each of the display elements in the row. The terms driver and driving element are used herein in examples to describe an electronic circuit or component for providing an appropriate signal such as a voltage level or voltage pulse for driving a display element, row and/or column.

When the transistor of a display element receives at its gate a voltage pulse of its row addressing signal, the transistor becomes conducting and it passes the signal level of its column driver to the electrode 17 of the electrowetting cell. In examples, a voltage pulse is a rapid, transient change in the voltage from a baseline value, for example a low voltage level, to a higher or lower value, for example a high voltage level higher in magnitude than the low voltage level, followed by a rapid return, i.e. change, to the baseline value. A voltage level may otherwise be referred to as a voltage potential. The time period between the two subsequent voltage changes of the voltage pulse is called a pulse duration. After the transistor has been switched off, so the transistor is no longer conducting, the voltage over the cell will be substantially maintained until the transistor is switched on again by the next row addressing signal for the display element. The time during which the transistor is switched off is called the holding state of the element. In this active matrix driving method the electrodes of the electrowetting cells are connected to the driving stages briefly at the start of a period during which they show a certain display effect. During this connection, a voltage related to the desired display effect is applied to the electrodes. After the display element is disconnected from the driver stage, the voltage on the electrodes is substantially maintained by one or more capacitors during the period during which the display element shows the display effect. The method is called 'active', because the display element contains at least one active element, for example a transistor.

Figure 4:
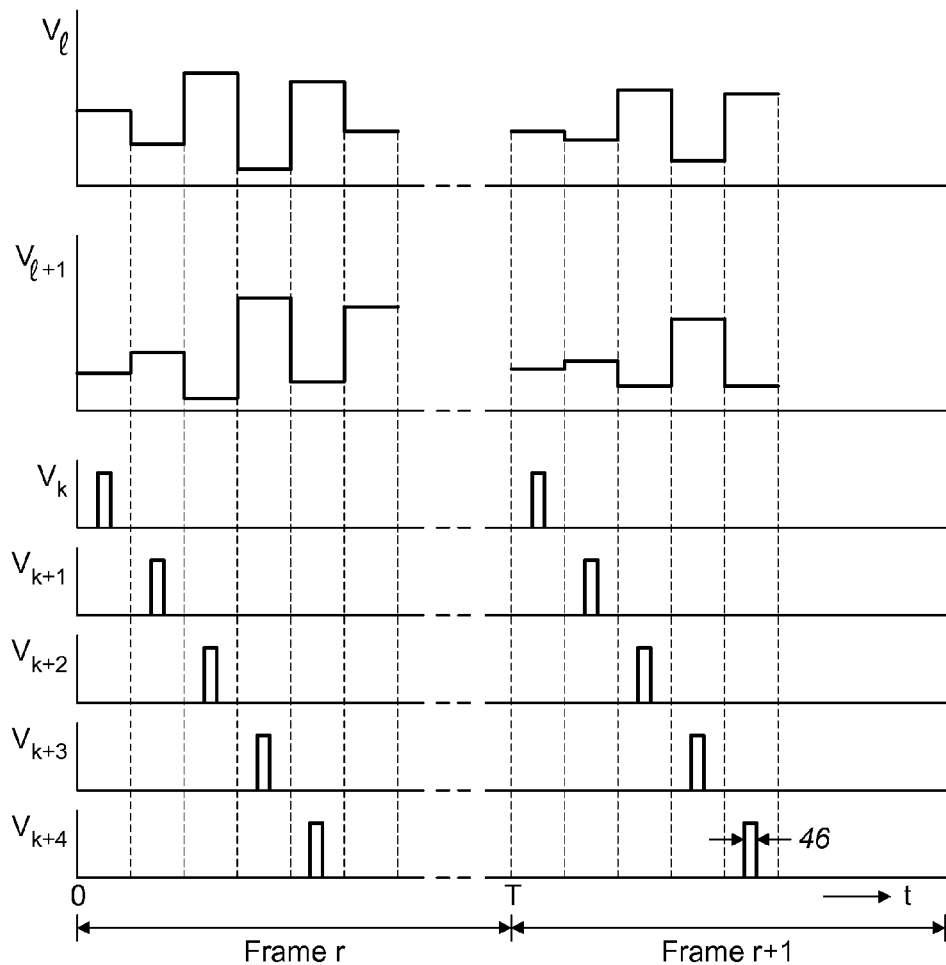
FIG. 4 shows schematically a driving method of the known display device.

FIG. 4 shows a diagram of an example method of driving the display elements in a display device having an active matrix configuration. The method displays images during a series of frames, for example, an image is displayed within the duration of one frame. During a frame all display elements of a display device may be addressed; in a matrix all rows of the matrix of a display device are addressed during a frame. FIG. 4 shows two column signals Vl and Vl+1 and five row addressing signals Vk . . . Vk+4 as a function of time t for two consecutive frames r and r+1. The duration of a frame or frame period is Tf. In examples, a frame period Tf is a pre-determined period for addressing the n rows of the matrix. In some examples the frame period is the period between consecutive addressing the same row. The duration of the period may be fixed, i.e. programmed, in the controller 33.

When row k is selected and addressed by a pulse on the row addressing signal Vk, as shown at the start of frame r in FIG. 4, the transistor in each display element of row k becomes conducting and the voltages on each of the column signal lines 44 will be put on the electrode 17 of each display element in row k. Subsequently, the display column driver 35 of FIG. 3 changes the voltages on the column signal lines to the values required for row k+1. When row k+1 is selected by a pulse on row addressing signal k+1, the voltages are put on the electrode 17 of FIG. 1 of the display elements of row k+1. All n rows of the display device will in this example be selected consecutively in a similar manner in frame r. The process of selecting the rows starts again in the following frame r+1.

In common display apparatuses the pulse duration of the voltage pulse of the row addressing signal, also called the gate period Tg or gate time, is such that the n rows of the display device can be addressed consecutively within one frame period. Common display apparatuses have therefore usually a pulse duration equal to or less than Tf/n. For example, addressing 1000 rows in a frame period of 20 milliseconds requires a pulse duration of 20 microseconds or less. The pulse duration 46 in the example of a driving scheme shown in FIG. 4 is shorter than Tf/n.

Figure 5:
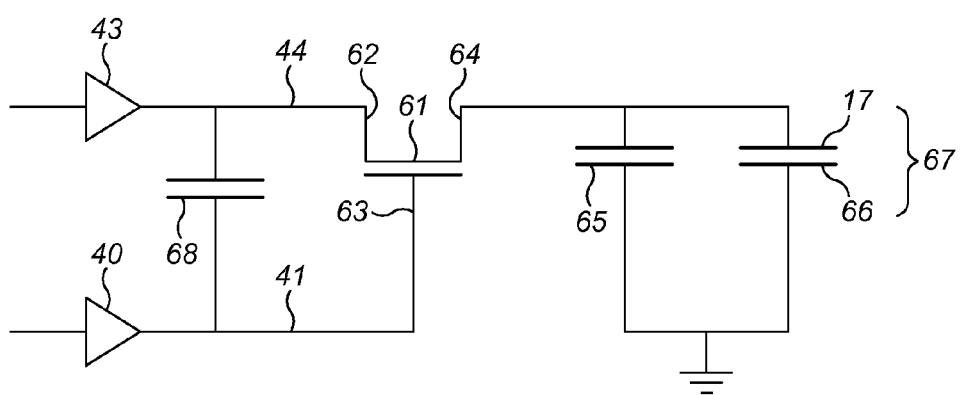
FIG. 5 shows schematically a parasitic capacitance.

It has been observed that in a known display device such as that illustrated with FIG. 3, a parasitic capacitance may arise between at least one column signal line and at least one row signal line. This parasitic capacitance is now explained with reference to FIG. 5. FIG. 5 shows a diagram of an example electronic circuit in a display element, clarifying the effect of the parasitic resistance. Identical elements in FIGS. 1, 3 and 5 have the same reference numeral. The output of the row driver stage 40 is connected to the row signal line 41. The output of the column driver stage 43 is connected to the column signal line 44. A switching element 61, a TFT in the present embodiment, has a source 62, a gate 63 and an emitter 64. The column signal line is connected to the source and the row signal line to the gate. A storage capacitor 65 having a capacitance Cs is arranged between the emitter and a common voltage, in the Figure indicated as ground. The emitter is also connected to the electrode 17 of the display element, forming a plate of an electrowetting capacitor 67. The interface 55 between the second fluid and the first fluid, or, when the first fluid is contracted, the interface 14 between the second fluid and the insulating layer plus the interface 57 between the second fluid and the contracted first fluid, forms another plate 66 of the electrowetting capacitor 67. The electrowetting capacitor has an electrical capacitance Ce, the value of which may depend on the configuration of the first and second fluid within the display element and the properties of the insulating layer 13. A parasitic capacitor 68 is shown between the column signal line 44 and row signal line 41, having a capacitance Cp. When driving an electrowetting element, a voltage pulse is applied to the switching element 61 by the row driving stage, so the voltage level provided by the column driver stage can be applied to the electrowetting element. When the electrowetting element is not being driven, no voltage pulse is applied to the switching element 61, and the row signal line is held for example at a zero or ground voltage level. However, even when the row of electrowetting elements including the electrowetting element shown in FIG. 5 is not being driven, other rows of the matrix may be driven. To drive any other row, an appropriate voltage level is applied to the column signal line 44 for the appropriate electrowetting element of that row. As a result, a parasitic capacitance 68 is created between any row signal line, including the row signal line 41 shown in FIG. 5 and which are held at zero volts or ground, and the column signal line 44 held at a higher magnitude voltage level than the row signal line. This parasitic capacitance increases the power that the column driver stage needs to provide to set the column signal lines to the required voltage level. Consequently, the existence of the parasitic capacitance increases the power requirements of the display device.

Figure 6:
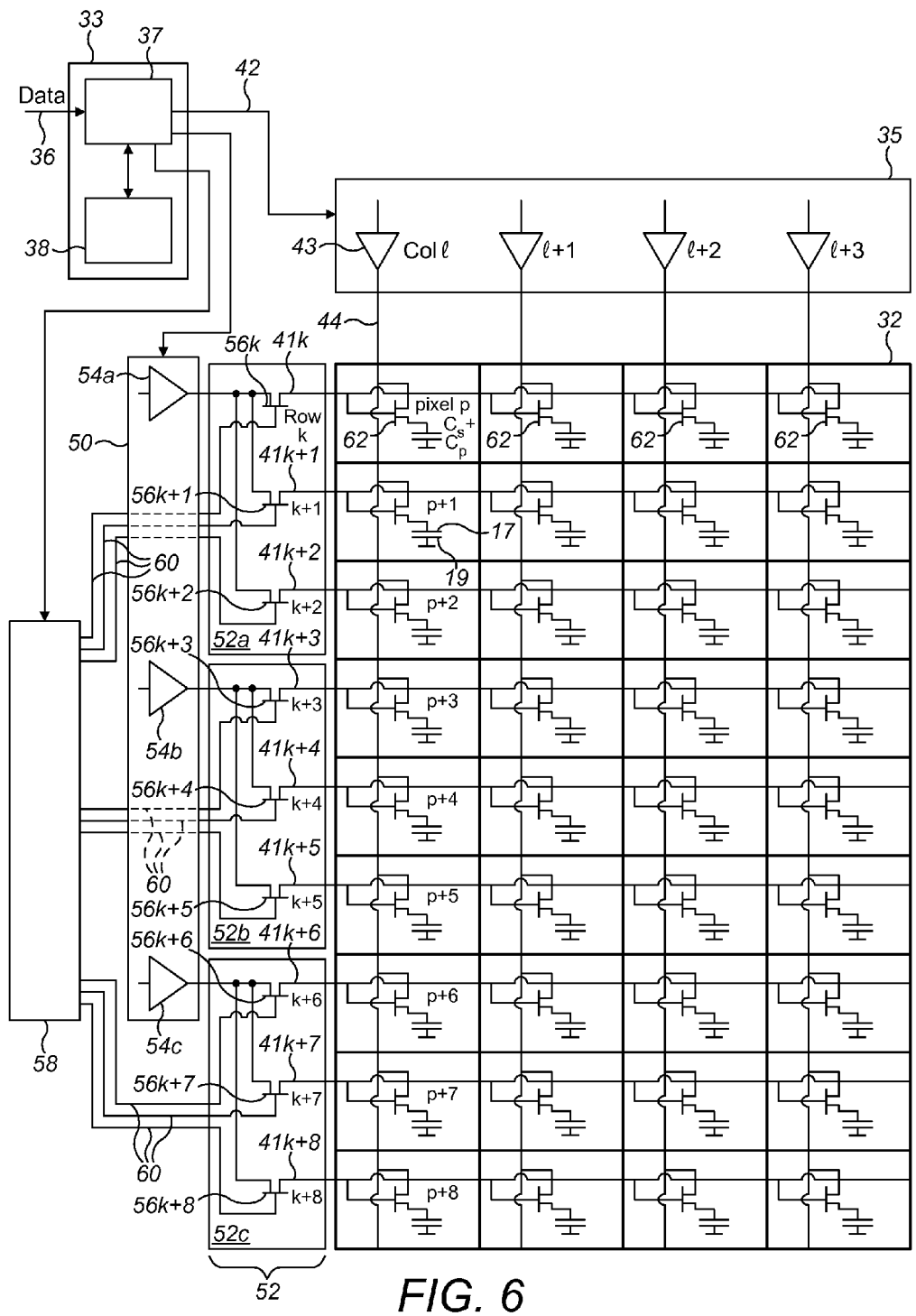
FIG. 6 shows schematically features of an example display device.

FIG. 6 shows an example of components of a new display apparatus with reduced power requirements compared with known display apparatus including the display device described above. The reduced power requirements are provided by reducing the parasitic capacitance explained with reference to FIG. 5.

Features described using FIG. 6 are similar or identical to those described with FIG. 3. Such features will be referred to herein and are shown in FIG. 6 using the same reference numbers; corresponding descriptions should be taken to apply also. Therefore, for the purposes of conciseness, differences shown in FIG. 6 compared with FIG. 3 will be described. It is noted that FIG. 3 illustrates five rows of display elements, namely rows k to k+4, whereas for the purposes of explanation FIG. 6 shows nine rows of display elements, namely rows k to k+8. In further examples there may be more columns and rows.

In the example of FIG. 6, the display apparatus includes a row driving system 50 and a row selection system 52 which in this example includes three row selection modules 52a, 52b, 52c. Each row selection module is for driving different groups of rows of electrowetting elements; in other words each row selection module is for driving a different plurality of rows of display elements. Therefore, a first row selection module 52a is for selecting any row of a first plurality of rows of display elements, namely rows k to k+2 including the first row of display elements, a second row selection module 52b is for selecting any row of a second plurality of rows of display elements, namely rows k+3 to k+5 including the second row of display elements, and a third row selection module 52c is for selecting any row of a third plurality of rows of display elements, namely rows k+6 to k+8. It is envisaged that in other examples each row selection module may be configured for selecting greater or fewer numbers of rows of display elements than three rows.

Each row selection module 52a, 52b, 52c corresponds with one driving element, which might otherwise be referred to as a driver or driver stage, used for driving any row of display elements of the plurality of rows associated with one row selection module. The driving elements are part of the row driving system. For example, a first driving element 54a is connectable via an output of the first driving element 54a to the row signal line 41 of row k, which for the sake of clarity in FIG. 5 is labelled 41k, but also to the row signal lines for rows k+1 and k+2, which are respectively labelled 41k+1 and 41k+2. Therefore the first row selection module 52a corresponds with the first driving element 54a which is used for driving any row of the first plurality of rows. The output of the first driving element is referred to herein also as the first output of the row driving system.

Similarly, a second driving element 54b corresponds with the second row selection module 52b and is connectable to any row signal line of the second plurality of rows, in this example three row signal lines 41k+3, 41k+4 and 41k+5. Further similarly, a third driving element 54c corresponds with the third row selection module 52c and is connectable to any row signal line of the third plurality of rows, in this example three row signal lines 41k+6, 41k+7 and 41k+8. Although in this example three pluralities of rows are illustrated, each plurality of rows including three rows of display elements, it is envisaged in further examples that the number of pluralities of rows may be greater or less than described herein and that the number of rows in each plurality of rows may be greater or less than described herein.

In this example, a different type of electronic component is used for each of the row driving elements 54a, 54b, 54c compared with the electronic component used as the row driving stage for known driving systems. In such known driving systems, the driving stage is controllable by an input signal to output either a high voltage level signal, or a low voltage level signal, lower than the high voltage level signal and which is for example zero volts or ground. Thus, with appropriate control of the driver stage, a voltage pulse can be output along the corresponding row signal line to switch the switching element for permitting the column voltage level to be applied to the appropriate display elements.

Referring to the present example, the electronic component used for each of the row driving elements 54a, 54b, 54c is controllable to selectively output, i.e. provide, a low voltage level signal, a high voltage level signal higher than the low voltage signal or a high impedance state. The low voltage level signal and the high voltage level signals may be similar to those of known systems. The high impedance state is a state of high resistance and prevents or minimises any flow of charge through the driving element. A resistance provided by the high impedance state may have a value in the range 100 kilo Ohms (kΩ) to 10 Mega Ohms (MΩ) depending on the specific construction and required functionality of the display device. Although a range is given for conciseness, it is to be appreciated that any value within this range is also considered to be explicitly described herein, for example 150.52 kilo Ohms (kΩ).

In this way, any signal line connected to the output of the driving element when in the high impedance state is not held at a particular voltage level, i.e. at a particular potential; in other words, any signal line connected to the output of the driving element when in the high impedance state may be referred to as floating. An example of such a driving element is an output buffer or a clock buffer having a high impedance state. Such a buffer may be switchable between a mode for outputting either a high or low voltage level signal, or a high impedance mode, by controlling an enabling input signal to the driving element, which enables, or disables, the high impedance mode. Such a buffer may otherwise be referred to as a tri-state buffer or a three-state buffer. The high impedance state might otherwise be referred to as a high Z-state, where Z is impedance, impedance being a property based on a resistance and a capacitance property, for example of a channel of a TFT.

The row driving system 50 receives data from the processor 37 for driving the driving elements. In the present example, when a row is to be driven, the processor generates and transmits the row driving voltage pulse to the appropriate driving element for driving the row to be driven. This voltage pulse is transmitted through and then output, i.e. transmitted from, the driving element, which in this example is an output buffer with a high impedance state as described previously. In other examples the processor transmits data to control the appropriate driving element to generate the row driving voltage pulse and then transmit the generated pulse for driving the appropriate row. Where the driving element is an output buffer with a high impedance state, the processor further controls each driving element to determine whether each driving element is in a high impedance mode or in a driving mode for outputting a high or low voltage level signal. This control may be via a separate control line to each driving element, which is not shown in the Figures.

In order for a row to be driven, a row driving voltage pulse outputted from one of the row driving elements is transmitted to the switching elements of the row of display elements in question. For each row, there is a switching element, for example a transistor 56, between the output of the driving element for driving the row in question and the row signal line for that row. Such a switching element 56 is therefore associated with one row of the n rows of display elements. There is therefore a first plurality of switching elements associated respectively with the first plurality of rows. The output of the driving element may therefore be connected to a source of the transistor 56 and the row signal line connected to a drain of the transistor 56, for each row. In examples where one driving element is for driving any of a plurality of rows, for example the first driving element for driving any of the first plurality of rows, the respective transistor 56 for each row is selectively, i.e. independently, switchable, by selectively applying a voltage pulse to a gate of the transistor 56, so that any rows to be driven are connected to the output of the driving element and the rows not to be driven are disconnected from the output of the driving element. In the example described using FIG. 6, each switching element associated with a row is labelled accordingly, i.e. 56k refers to the switching element associated with row k, 56k+1 refers to the switching element associated with row k+1; this labelling system applies similarly to rows k+2 to k+8.

The selective switching of the switching element 56 associated with each row is performed in examples described herein by the row selection system. More specifically, where one driving element is connectable to drive any row of a plurality of rows, the corresponding row selection module for that plurality of rows is used to selectively connect rows with the driving element output. This will be explained in further detail below.

Each switching element, in this example the transistor 56, associated with a row of display elements is switchable by a voltage pulse transmitted by a row selection system controller 58. Therefore, the controller 58 is connected to each switching element associated with a row, in this example the controller is connected to a gate of each transistor 56, by control lines 60. The controller includes appropriate driving elements for switching the transistors 56, so as to connect and disconnect the output of the appropriate driving element with the appropriate row signal line. The controller 58 receives data from the processor 37 for controlling switching of the switching elements 56 associated with the rows.

Figure 9A:
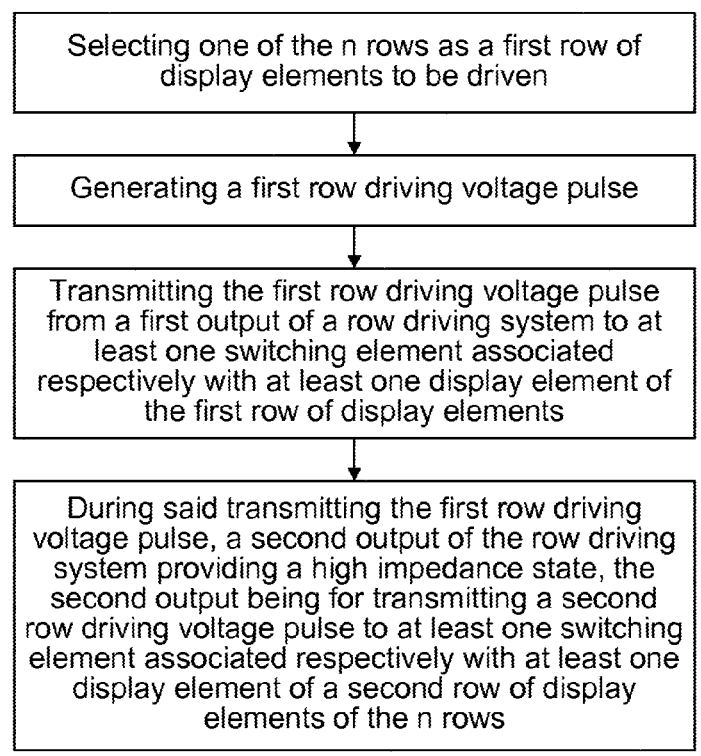
FIG. 9A and FIG. 9B are flow diagrams of examples of control methods.

An example of a method of controlling the display device illustrated using FIG. 6 will now be described. In particular, controlling of the row driving system for driving at least one of the n rows of display elements will be described; the row k will be referred to herein as the first row, but it is to be appreciated that another row within the same plurality of rows could be taken as the first row. Reference is also made to FIG. 9A which shows a flow diagram relating to an example control method.

In driving the first row k of display elements, a first row driving voltage pulse is applied to at least one switching element 62 associated respectively with at least one of the display elements of the first row k. So, in this example, each switching element 62 is a transistor, in this case a TFT, described previously, which forms the active element of each display element, i.e. pixel, of the first row k.

The controller 33 initiates driving of a row, in this case row k. Data indicative of an image to be displayed by the display device is received on input line 36. Using this data, the controller determines when each row is to be driven and the data that is to be applied to each display element via the column signal lines. Therefore, for driving the first row k in this example, the controller selects one of the n rows to be driven, which selected row is the first row k. The row to be driven may for example be selected based on one or more of: data received on input 36 and indicative of changing a display state provided by at least one display element of the first row of display elements and data indicative of a sequence for driving at least some of the n rows of display elements. A first row driving voltage pulse is then generated, in this example by the controller 33, although in other examples a driving element may generate the first row driving voltage pulse. The voltage pulse is provided for example by controlling the driving element to output a low voltage level signal, followed by a high voltage level signal (higher than the low voltage level signal) for a time period corresponding with a duration of the row driving voltage pulse to be output, followed again by the low voltage level signal. The first row driving voltage pulse is transmitted from the controller to the first driving element 54a, which is set by the controller in a driving mode for enabling, i.e. switching, the driving element to transmit the first row driving voltage pulse from the first output. In other words, the high impedance state of the first driving element is disabled by the controller. In order for the first driving element to transmit the first row driving pulse to the switching elements 62 associated with the display elements of the first row k, the row selection system selectively switches the switching elements 56k, 56k+1, 56k+2 associated with each row of the first plurality of rows with signals transmitted from the row selection system controller 58 via the control lines 60. The display controller 33 coordinates controlling of the row driving system and the row selection system in order to drive a row of display elements. A clock signal may be used for this coordination, as will be appreciated by the person skilled in the art.

Therefore, to drive the first row k, the row selection system is controlled to transmit and therefore apply a voltage pulse to the gate of the transistor 56k in order to connect an output of the first driving element, i.e. the first output of the row driving system, to the at least one switching element 62 associated respectively with at least one display element of the first row k. This voltage pulse may otherwise be referred to as a first row selection voltage pulse. During application of this voltage pulse, to the gate of the transistor 56k, the first driving element transmits the first row driving voltage pulse from its output, to be transmitted through the transistor 56k to the switching elements 62 associated respectively with the display elements of the first row k.

So that the first row driving voltage pulse is applied in this example only to the switching elements 62 associated respectively with the display elements of the first row k, the row selection system controller 58 may switch the switching elements associated with further rows of the first plurality of rows to disconnect, i.e. without connecting, the output of the first driving element 54a from the at least one switching element 62 associated respectively with the at least one display element of the further rows of the first plurality of rows of display elements, in this example rows k+1 and k+2. As will be appreciated this disconnecting may be achieved by not applying a voltage pulse to the gate of the switching elements 56. Instead, the controller 58 may apply to the gate of each switching element 56 a low voltage level signal, for example zero volts or ground, for those switching elements 62 to be disconnected from the first driving element output. It is envisaged that should it be desired to drive more than one row of display elements of the first plurality of rows together, this can be achieved by the row driving system controller selectively switching the appropriate switching elements 56 associated with the rows to be driven.

During driving the first row, the output of a driving element for driving any row of a different plurality of rows than the first plurality of rows may be switched to a high impedance state. Therefore, the output of the second driving element 54b, which is otherwise referred to herein as the second output of the row driving system, for driving at least a second row of display elements, may be switched to a mode for providing a high impedance state, whilst the first row k is being driven. In this example the second row is referred to as the row labelled k+3 but it is to be appreciated that another row which is not a row of the first plurality of rows may alternatively be taken as the second row. As explained above, the second driving element is controllable to provide a high impedance state during driving the first row.

During driving of the first row, the row switching system may switch the switching element 56 associated with each row of the second and third pluralities of rows, indeed in further examples for any row other than the first plurality of rows, to disconnect the output of the appropriate driving element from the row line connecting the switching element 56 to the switching elements 62 associated respectively with the at least display element of the rows. In other examples, the row selection system may switch each switching element 56 associated with a row outside of the first plurality of rows, for example the second row, to connect the output of the appropriate driving element, for example the output of the second driving element for driving the second row, to the switching elements 62 associated respectively with the display elements of the row in question. This would therefore hold the gate of the display element switching elements 62 at the high impedance state. In this way, a row selection module may be considered a de-multiplexer, due to its ability to apply a voltage level state from a single output to a plurality of connection lines.

Once the first row of display elements has been driven, a different row of the n rows of display elements may be driven. This will now be explained with the example of driving the second row, in this example row k+3, after driving the first row which in this example is row k.

After driving the first row k, the second row k+3 may for example be driven by applying a second row driving voltage pulse to at least one switching element 62 associated respectively with at least one display element of the second row k+3. Driving the second row of display elements k+3 is initiated by the controller 33 in a similar manner as for driving the first row k, described previously, except that the second row k+3 is selected by the controller for driving rather than the first row k. Accordingly, the second row driving voltage pulse is generated by the controller 33, in a similar manner as for the first row driving voltage pulse and is transmitted to the second driving element 54b, as the second row k+3 is part of the second plurality of rows drivable by the second driving element. The second driving element 54b is switched to the driving mode enabling transmittal of the second row driving voltage pulse from the second output. So the second row driving voltage pulse can be transmitted from the second output to the at least one switching element 62 associated respectively with at least one display element of the second row k+3, the row selection system is controlled by the controller 58 to transmit a second row selection voltage pulse to the switching element 56k+3 associated with the second row k+3 of display elements. This therefore connects the second output of the row driving system and in this example therefore the second driving element to the at least one switching element 62 associated respectively with at least one display element of the second row k+3 of display elements. It is to be appreciated that any row of the second plurality of rows is connectable to the second output by independently switching a corresponding switching element of a second plurality of switching elements 56 associated respectively with the second plurality of rows of display elements.

During driving the second row k+3, the row selection system in this example controls the switching element 56k associated with the first row k to disconnect the first output of the row driving system from the at least one switching element 62 associated respectively with the at least one display element of the first row k. This is done by for example removing application of the first row selection voltage pulse from the switching element 56. In other examples the first driving element may remain connected, if the row selection system transmits a suitable voltage level signal to the gate of the switching element 56k associated with the first row k. Furthermore, during driving the second row k+3, the first driving element is switched, i.e. set, i.e. configured, to a mode such that the first output provides a high impedance state; thus the first driving element may be selectively switched between a driving mode and a high impedance mode, depending on whether the first driving element is required to drive a row or not.

During driving the second row k+3, the second driving element may be disconnected from the other rows of the second plurality of rows, by appropriate control of the switching elements 56 associated with the other rows of the second plurality of rows, in this example the switching elements labelled 56k+4 and 56k+5, unless it is desired to drive more than one row of the second plurality of rows simultaneously by appropriate switching of the switching elements 56k+4, 56k+5, associated with the rows.

It has been explained above that the second row may be driven after driving the first row. It is envisaged in further examples that after driving the first row and before driving the second row, a different row of the first plurality of rows than the first row may be driven. For example, each row of the first plurality of rows may be driven in a predetermined sequence, for example consecutively after an adjacent row in the first plurality of rows. Therefore, in examples, each row of the first plurality of rows may be driven before driving rows in another plurality of rows such as the second plurality of rows.

Such a different row may be driven after driving the first row by applying a different row driving pulse to at least one switching element associated respectively with at least one display element of the different row of display elements. Such driving may be performed in a similar manner as described for driving the first row, namely for example by selecting one of the first plurality of rows different from the first row of display elements as the different row of display elements to be driven. A different row driving voltage pulse may then be generated for example by the processor 37 which pulse is then transmitted from the first output to the at least one switching element associated respectively with at least one display element of the different row of display elements. During this driving of the different row of the first plurality of rows of display elements, the setting of the second output of the row driving system to provide the high impedance state may be maintained. Further, the row selection system may be controlled to disconnect the first output from the at least one switching element associated respectively with at least one display element of the first row and to connect the first output to at least one switching element associated respectively with at least one display element of the different row of display elements.

Indeed, during driving of any row of display elements of the first plurality of rows of display elements to apply a row driving voltage pulse to at least one switching element associated respectively with at least one display element of the any row, which any row includes the first row k, at least one further output of the row driving system, for driving at least one row of display elements of a further plurality of rows, may be set to provide a high impedance state. This may be in addition to setting the second output to provide a high impedance state. For example, an output of the third driving element and possibly all other outputs of the row driving system except for the first output may for example be set to provide a high impedance state.

Figure 7:
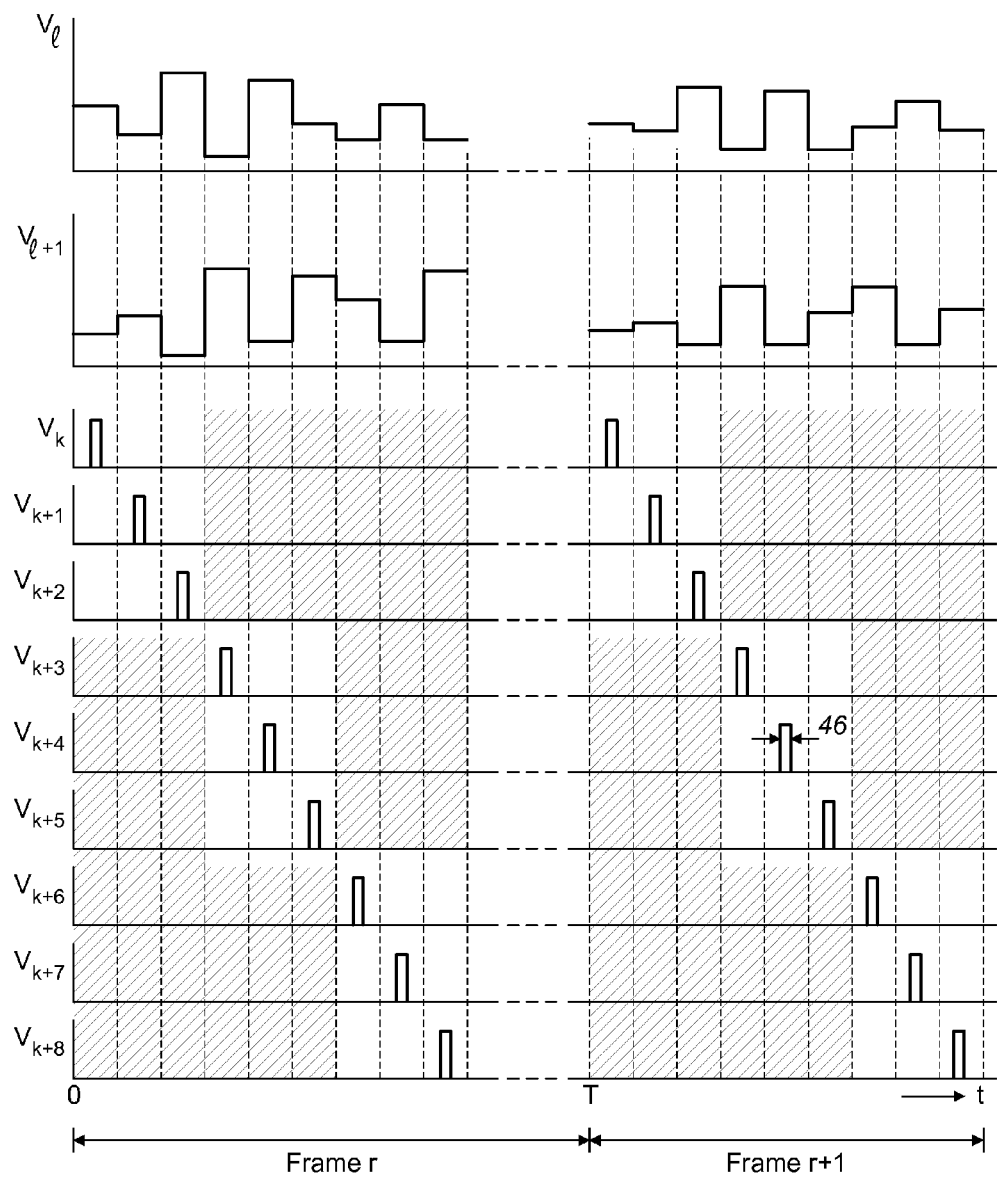
FIG. 7 shows schematically a driving method of the example display device.

FIG. 7 shows schematically an example of a method of driving the display elements shown in FIG. 6. Specifically, FIG. 7 shows driving of each row of display elements consecutively, starting with row k and ending with row k+8. This Figure is similar to that of FIG. 4 except that nine row addressing signals Vk to Vk+8 are illustrated, corresponding to the nine rows of display elements shown in FIG. 6. A similar description as that given for FIG. 4 should be taken to apply here also with the exception that the driving of the rows is performed using the circuitry shown in FIG. 6 and not as shown in FIG. 3. In FIG. 7, the shaded regions denote when a driving element provides a high impedance state, compared with a non-shaded region which denotes when the appropriate driving element is switched to a mode for providing a row driving voltage pulse, which is referred to when describing FIG. 3 as a row addressing signal. Therefore, referring to FIG. 7, the horizontal plot corresponding to the first row signal Vk shows from left to right the output provided for each row from k to k+8 when driving the first row k. Therefore, on the left hand side, the voltage signal Vk for driving the first row is shown as a row driving voltage pulse. Moving towards the right hand side of the horizontal plot for driving the first row k, a low voltage level signal is provided for rows k+1 and k+2, as shown by the non-shaded region of the horizontal plot for the first row signal Vk. Moving further to the right, for rows Vk+3 to Vk+8, which form the second plurality of rows and the third plurality of rows, the corresponding driving element, namely the second and third driving elements, provide a high impedance state as shown with the shaded regions for the horizontal plot for driving the first row.

Providing a high impedance state output for selected rows of display elements reduces the parasitic capacitance effects with a column signal line which arises in known devices. For example, when driving the first row of display elements, the output from the second and third driving elements, for driving the second and third pluralities of rows, provides a high impedance state. In this example only the output from the first driving element for driving a row provides a voltage signal level which may cause parasitic capacitance effects with a column signal line. Thus, a smaller proportion of outputs of the driving elements may cause a parasitic capacitance effect when driving a row, compared with known devices. This is because for the output lines set with a high impedance, the line is no longer held at a given voltage level such as a ground voltage level, but the voltage level can instead vary with any change in voltage level of the column line signal. This therefore notably reduces the power requirements of the display device described in examples herein compared with known display devices. Such a variation of voltage level may be in the range of 1.5 to 2.5 Volts which, depending on a refresh rate of readdressing a display element and the size of TFTs used as switching elements, may not be large enough to cause undesired switching of a TFT gate.

It is noted too that the row driving circuitry described for example with reference to FIG. 6 does not require a shift register as used in known row driving systems for example that described with reference to FIG. 3. A shift register in known systems is commonly mounted on a ledge of a substrate, which ledge borders the matrix of display elements formed on the substrate. It is therefore necessary in known devices to provide a sufficiently wide ledge, for example in the range 4 to 6 millimeters, to mount the shift register together with the driving elements, which are otherwise referred to herein as driver stages, for the rows. In contrast, in the examples described herein without needing a shift register, the width of the ledge may be reduced for example to 2 to 3 millimeters, which reduces the overall size of the display device. In such examples, the ledge merely needs to be wide enough for the driving elements to be mounted thereon.

It is noted too that in known display apparatus, for example as described using FIG. 3, with one driver stage per row, each driver stage has an input signal line and an output signal line. In contrast, in the example of FIG. 6 for example, where there are three driving elements for driving nine rows, the number of input signal lines may be notably reduced. Indeed, the number of signal lines may be further reduced if each driving element can be connected for driving a greater number of rows; for example each plurality of rows may include five or ten rows drivable by one driving element. This reduction in the number of signal lines and the number of driving elements may, compared with known devices, simplify manufacture of the display apparatus and may further reduce the size of the ledge required for mounting row driving circuitry.

Further, without needing a shift register as in known devices, driving of the rows consecutively may no longer be required, as the row selection system described above allows each row to be controlled independently of other rows within a plurality of rows. This gives more flexibility over row driving and facilitates driving of multiple rows together within the same plurality of rows, if the same column voltage signal is to be applied to display elements of the same column but different rows.

The phrase plurality of rows is used above to refer to a group of rows controllable by one driving element. Such a group may be referred to otherwise as a segment. Although in examples described above have one driving element for driving multiple rows, in other examples it is envisaged that each row may be associated with a respective driving element, i.e. there is one driving element per row; in such examples the row selection system may not be necessary as driving of each row is controlled by coordinating which driving element outputs a row driving voltage pulse and which driving element(s) are set to provide a high impedance state. Such a driving element may provide the high impedance state, but with the greater number of driving elements, driving of the rows may be more flexibly performed; for example more varied sequences of driving the rows may be used.

Examples described above relate to an electrowetting display device with electrowetting display elements. However, it is envisaged that the driving circuit of examples described herein, for example using FIG. 3, may be used for driving rows of other types of display element, for example a liquid crystal display (LCD) element, an organic light emitting diode (OLED) display element or an electrophoretic display element. It is noted however that an electrowetting display element has higher power requirements than an LCD element for example; by a factor of 2 for example. Therefore, the row driving circuitry described in electrowetting examples herein, with a reduced parasitic capacitance compared with a known LCD or electrowetting display device, gives a larger reduction in power requirements.

Figure 8:
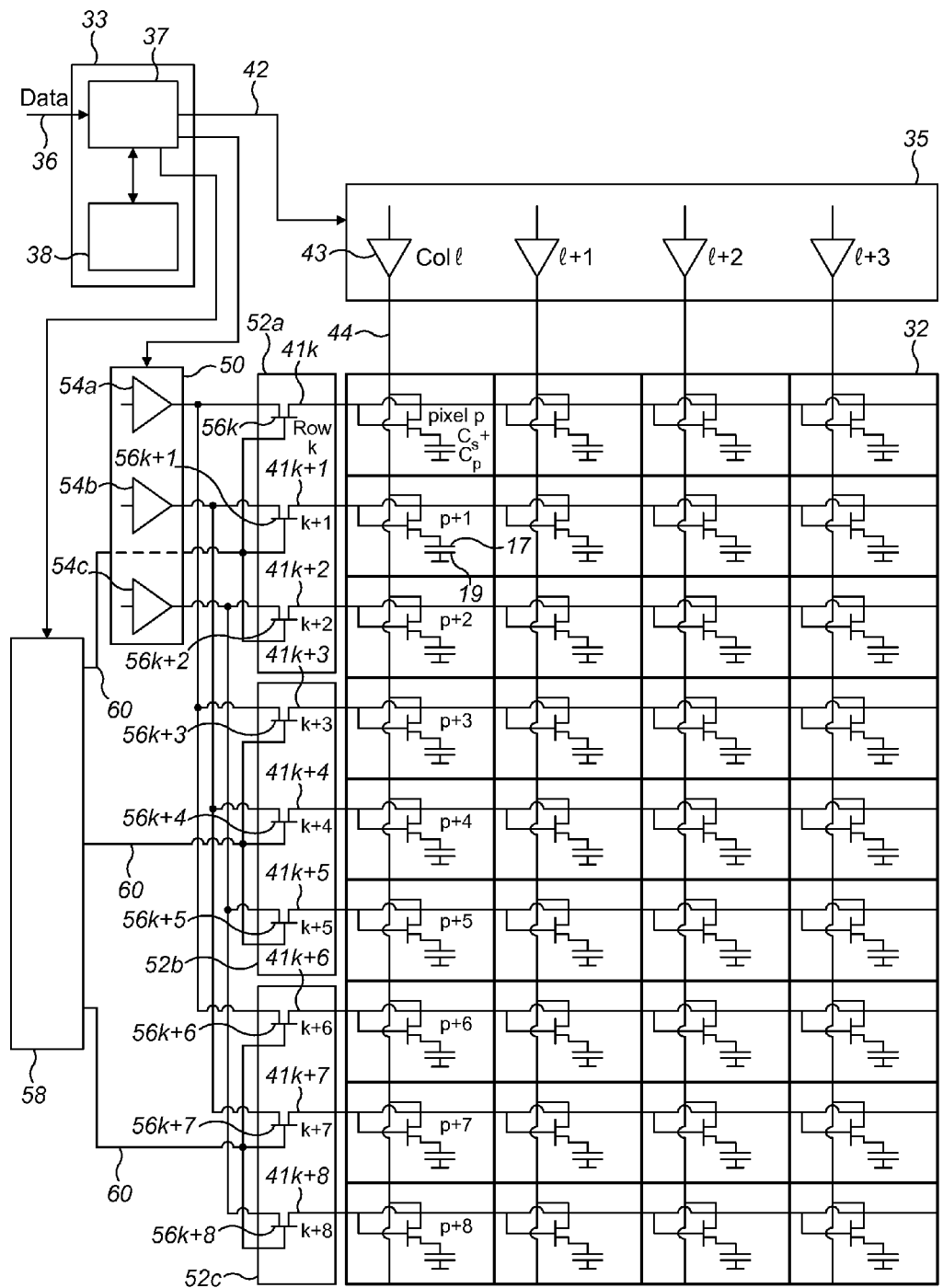
FIG. 8 shows schematically features of a different example of a display device.

The above examples are to be understood as illustrative examples. Further examples are envisaged. For example, FIG. 8 shows an alternative circuit configuration from that illustrated in FIG. 6; many features are the same and are therefore labelled with the same reference numerals; corresponding descriptions should be taken to apply here too. In the example of FIG. 8, one output signal line from a driving element is connectable to the switching elements associated respectively with rows of different pluralities of rows. Therefore, for example, the first driving element 54a can be used to drive row k, row k+3 and row k+6. Therefore, when driving the first row k for example, the gate of each of the switching elements 56k, 56k+1, 56k+2 associated respectively with each row of the first plurality of rows is switched to connect the first output to the switching elements associated with the display elements of the rows. The first row is therefore driven by transmitting a row driving voltage pulse from the first driving element and setting the second and third display elements to a high impedance state. To drive the second row k+3, the first driving element is again used, but instead the gates of the switching elements associated respectively with the rows of the second plurality of rows are switched to connect the first output with the row signal lines 41 of the second plurality of rows. To drive the row k+1, the first driving element is set to the high impedance state and the second driving element provides a row driving voltage pulse, with appropriate switching of the switching elements 56k, 56k+1, 56k+2 associated respectively with each row of the first plurality of rows. The number of driving elements and therefore lines connected to an output of a driving element and the number of lines for switching a switching element associated with one of the rows may be chosen accordingly when designing the display apparatus, for example to minimise the number of lines and/or the number of driving elements required. Such a reduced number may for example reduce the cost or complexity of manufacturing the display apparatus.

Figure 10:
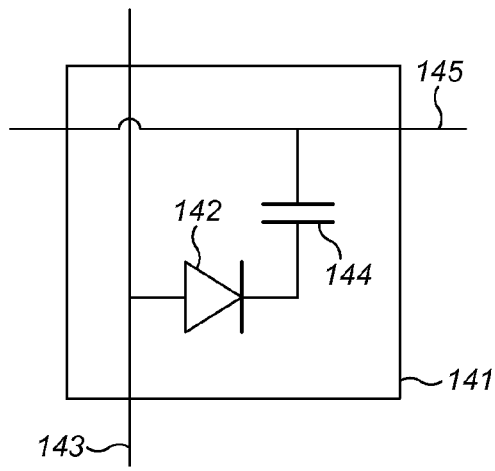
FIG. 10 shows schematically an example of a display element.

Whereas the switching element in the embodiment of the display device 32 shown in FIG. 3 is a transistor, it may alternatively be a diode in further examples. FIG. 10 shows an example of an active matrix display element 141 including a diode 142. The display element is similar to the display elements shown in FIG. 3. Two terminals of the diode are connected respectively to a column signal line 143 and to a pixel capacitor 144. The pixel capacitor is also connected to a row signal line 145, as shown in the figure. An addressing signal at the row signal line, such as a voltage pulse, will put the diode in a conducting state and a voltage depending on the voltage at the column signal line will be applied to the pixel capacitor. Using a long pulse duration for the row addressing will bring the voltage across the capacitor 144 closer to the intended value.

It is to be noted that the driving technique for rows and columns of display elements may be reversed in further envisaged examples; i.e. the matrix may be configured such that the row driving techniques described above are applied for columns of display elements and that the column driving techniques described above are applied for rows of display elements.

Figure 9B:
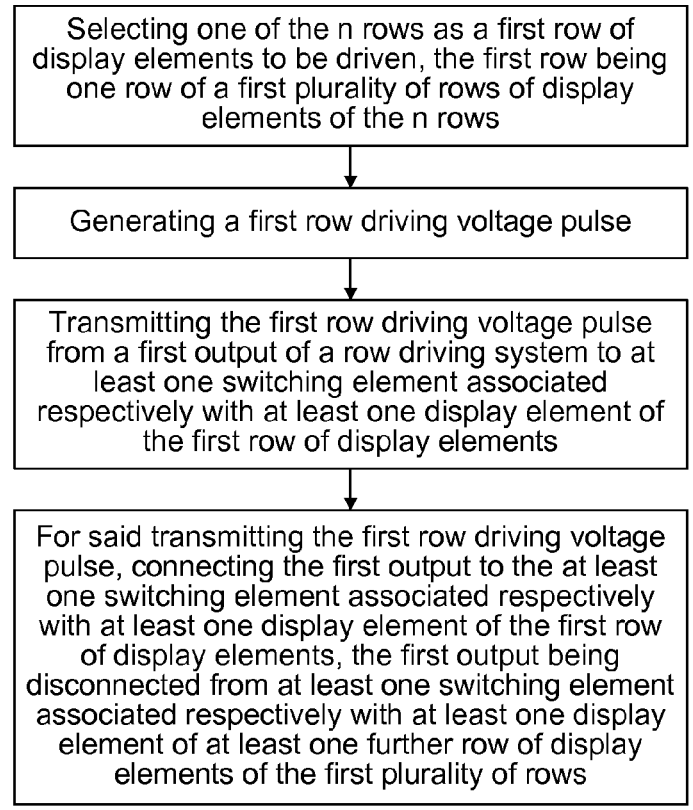

It is further to be noted that although the driving of the display elements is described above in examples using a driving element which can provide a high impedance state, further examples are envisaged which use a known driving element, for example which is controllable to provide either a high voltage level or a low voltage level, without a high impedance state being available. In such examples, the same row selection system may be used as described above, for connecting an output of the row driving system to an appropriate row of display elements. Corresponding descriptions should be taken to apply in such examples. Therefore, referring to FIG. 9B, in some examples, a method of controlling a display device as above includes selecting one of the n rows as a first row of display elements to be driven, with the first row being one row of a first plurality of rows of display elements of the n rows. A first row driving voltage pulse may then be generated and transmitted from a first output of a row driving system to at least one switching element associated respectively with at least one display element of the first row of display elements. For the transmitting of the first row driving voltage pulse, the row selection system is controlled to connect the first output to the at least one switching element associated respectively with at least one display element of the first row of display elements; the first output is disconnected from at least one switching element associated respectively with at least one display element of at least one further row of display elements of the first plurality of rows.

It is to be understood that any feature described in relation to any one example may be used alone, or in combination with other features described and may also be used in combination with one or more features of any other of the example, or any combination of any other of the examples. Furthermore, equivalents and modifications not described above may also be employed without departing from the scope of the accompanying claims.

What is claimed is:

1. A method of controlling a display device comprising display elements arranged in a matrix with n rows of display elements, the method comprising:
    selecting one of the n rows as a first row of display elements to be driven, the first row being one row of a first plurality of rows of display elements of the n rows;
    generating a first row driving voltage pulse;
    transmitting the first row driving voltage pulse from a first output of a row driving system to at least one switching element associated respectively with at least one display element of the first row of display elements;
    for the transmitting the first row driving voltage pulse, connecting the first output to the at least one switching element associated respectively with at least one display element of the first row of display elements, the first output disconnected from at least one switching element associated respectively with at least one display element of at least one further row of display elements of the first plurality of rows;
    after the transmitting the first row driving voltage pulse:
        selecting one of the n rows, different from the first row of display elements, as a second row of display elements to be driven, the second row being one row of a second plurality of rows of display elements of the n rows;
        generating a second row driving voltage pulse; and
        transmitting the second row driving voltage pulse from a second output of the row driving system to at least one switching element associated respectively with at least one display element of the second row of display elements, and
    for the transmitting the second row driving voltage pulse:
        switching a first driving element to a high impedance mode for the first output to provide a high impedance state, the first driving element connected to the first output;
        switching a second driving element to a driving mode for the transmitting of the second row driving voltage pulse from the second output, the second driving element connected to the second output; and
        connecting the second output to the at least one switching element associated respectively with at least one display element of the second row of display elements, with the second output disconnected from at least one switching element associated respectively with at least one display element of at least one further row of display elements of the second plurality of rows.

2. The method according to claim 1, comprising, after the transmitting the first row driving voltage:
    selecting one of the first plurality of rows of display elements, different from the first row of display elements, as a different row of display elements to be driven;
    generating a different row driving voltage pulse;
    transmitting the different row driving voltage pulse from the first output to at least one switching element associated respectively with at least one display element of the different row of display elements;
    for the transmitting the different row driving voltage pulse, disconnecting the first output from the at least one switching element associated respectively with at least one display element of the first row of display elements; and
    connecting the first output to the at least one switching element associated respectively with at least one display element of the different row of display elements.

3. The method according to claim 2, wherein
    the disconnecting the first output from the at least one switching element associated respectively with at least one display element of the first row of display elements comprises removing a first row selection voltage pulse from a switching element associated with the first row of display elements, and
    the connecting the first output to the at least one switching element associated respectively with at least one display element of the different row of display elements comprises transmitting a different row selection voltage pulse to a switching element associated with the different row of display elements.

4. The method according to claim 1, wherein the connecting the first output to the at least one switching element associated respectively with at least one display element of the first row of display elements comprises transmitting a first row selection voltage pulse to a switching element associated with the first row of display elements.

5. The method according to claim 1, the first output disconnected from at least one switching element associated respectively with at least one display element, for all rows of the first plurality of rows except the first row of display elements.

6. The method according to claim 1, comprising, for the transmitting the second row driving voltage pulse, disconnecting the first output from at least one switching element associated respectively with at least one displayelement of each row of display elements of the first plurality of rows of dis play elements.

7. The method according to claim 1, comprising, for the transmitting the second row driving voltage pulse, connecting the first output to at least one switching element associated respectively with at least one display element of each row of display elements of the first plurality of rows of display elements.

8. A display apparatus comprising a display device comprising a matrix with n rows of display elements comprising:
  a first plurality of rows of display elements of the n rows; and
  a second plurality of rows of display elements of the n rows;
  the display apparatus comprising:
  a row driving system comprising a first output and a second output, the row driving system configurable for the first output to provide a high impedance state with the first output not transmitting a row driving voltage pulse, and the row driving system configurable, independently of the first output, for the second output to provide a high impedance state with the second output not transmitting a row driving voltage pulse;
  a row selection system comprising:
  a first switching element, associated with a first row of display elements of the first plurality of rows of display elements, and switchable to selectively connect the first row of display elements to the first output;
  at least one further first switching element, associated respectively with at least one further row of display elements of the first plurality of rows of display elements, and independently switchable to selectively connect a respective one of any of the at least one further row of display elements of the first plurality of rows of display elements to the first output;
  a second switching element, associated with a second row of display elements of the second plurality of rows of display elements, and switchable to selectively connect the second row of display elements to the second output; and
  at least one further second switching element, associated respectively with at least one further row of display elements of the second plurality of rows of display elements, and independently switchable to selectively connect a respective one of any of the at least one further row of display elements of the second plurality of rows of display elements to the second output.

9. The display apparatus according to claim 8, comprising a controller configured to selectively switch the first switching element and the at least one further first switching element, wherein, for transmitting a first row driving voltage pulse from the first output to at least one switching element associated respectively with at least one display element of the first row of display elements, the controller is configured to:
  switch the first switching element to connect the first output to the at least one switching element associated respectively with at least one display element of the first row of display elements; and
  switch the at least one further first switching element to disconnect the first output from at least one switching element associated respectively with at least one display element of the at least one further row of display elements of the first plurality of rows of display elements.

10. The display apparatus according to claim 9, wherein the controller is configured to, after the transmitting the first row driving voltage pulse:
  switch the first switching element to disconnect the first output from the at least one switching element associated respectively with at least one display element of the first row of display elements; and
  switch the at least one further first switching element to connect the first output to the at least one switching element associated respectively with the at least one display element of the at least one further row of display elements of the first plurality of rows of display elements.

11. The display apparatus according to claim 8, comprising a controller configured to selectively switch the second switching element and the at least one further second switching element, wherein, for transmitting a second row driving voltage pulse from the second output to at least one switching element associated respectively with at least one display element of the second row of display elements, the controller is configured to:
  switch the second switching element to connect the second output to the at least one switching element associated respectively with at least one display element of the second row of display elements; and
  switch the at least one further second switching element to disconnect the second output from at least one switching element associated respectively with at least one display element of the at least one further row of display elements of the second plurality of rows of display elements.

12. The display apparatus according to claim 8, wherein the row driving system comprises a first driving element having the first output and a second driving element having the second output, each of the first driving element and the second driving element independently switchable between a driving mode, for transmitting of a row driving voltage pulse from the respective one of the first output or the second output, and a high impedance mode, for providing a high impedance state from the respective one of the first output or the second output.

13. The display apparatus according to claim 8, wherein the display apparatus is an electrowetting display apparatus and the display elements are each an electrowetting display element respectively comprising a first fluid and a second fluid substantially immiscible with the first fluid, each of the display elements configurable to provide a respective display effect by controlling a configuration of the first fluid and the second fluid.

14. An apparatus for controlling a display device comprising display elements arranged in a matrix with n rows of the display elements, comprising:
  at least one processor; and at least one memory comprising computer program instructions, the at least one processor, the at least one memory and the computer program instructions being configured to cause the at least one processor to perform a method of controlling the display device, the method comprising:

selecting one of the n rows as a first row of display elements to be driven, the first row being one row of a first plurality of rows of display elements of the n rows;

generating a first row driving voltage pulse;

transmitting the first row driving voltage pulse from a first output of a row driving system to at least one switching element associated respectively with at least one display element of the first row of display elements; and for the transmitting the first row driving voltage pulse, connecting the first output to the at least one switching element associated respectively with at least one display element of the first row of display elements, the first output disconnected from at least one switching element associated respectively with at least one display element of at least one further row of display elements of the first plurality of rows;

after the transmitting the first row driving voltage pulse:

selecting one of the n rows, different from the first row of display elements, as a second row of display elements to be driven, the second row being one row of a second plurality of rows of display elements of the n rows;

generating a second row driving voltage pulse; and transmitting the second row driving voltage pulse from a second output of the row driving system to at least one switching element associated respectively with at least one display element of the second row of display elements, and for the transmitting the second row driving voltage pulse:

switching a first driving element to a high impedance mode for the first output to provide a high impedance state, the first driving element connected to the first output;

switching a second driving element to a driving mode for the transmitting of the second row driving voltage pulse from the second output, the second driving element connected to the second output; and connecting the second output to the at least one switching element associated respectively with at least one display element of the second row of display elements, with the second output disconnected from at least one switching element associated respectively with at least one display element of at least one further row of display elements of the second plurality of rows.

15. The apparatus according to claim 14, the method comprising, after the transmitting the first row driving voltage:

selecting one of the first plurality of rows of display elements, different from the first row of display elements, as a different row of display elements to be driven;

generating a different row driving voltage pulse;

transmitting the different row driving voltage pulse from the first output to at least one switching element associated respectively with at least one display element of the different row of display elements;

for the transmitting the different row driving voltage pulse, disconnecting the first output from the at least one switching element associated respectively with at least one display element of the first row of display elements; and connecting the first output to the at least one switching element associated respectively with at least one display element of the different row of display elements.

16. The apparatus of claim 15, wherein the disconnecting the first output from the at least one switching element associated respectively with at least one display element of the first row of display elements comprises removing a first row selection voltage pulse from a switching element associated with the first row of display elements, and the connecting the first output to the at least one switching element associated respectively with at least one display element of the different row of display elements comprises transmitting a different row selection voltage pulse to a switching element associated with the different row of display elements.

17. The apparatus of claim 14, wherein the connecting the first output to the at least one switching element associated respectively with at least one display element of the first row of display elements comprises transmitting a first row selection voltage pulse to a switching element associated with the first row of display elements.

18. The apparatus of claim 14, the first output disconnected from at least one switching element associated respectively with at least one display element of all rows of the first plurality of rows except the first row of display elements.

19. The apparatus of claim 14, comprising, for the transmitting the second row driving voltage pulse, disconnecting the first output from at least one switching element associated respectively with at least one display element of each row of display elements of the first plurality of rows of display elements.

20. The apparatus of claim 14, comprising, for the transmitting the second row driving voltage pulse, connecting the first output to at least one switching element associated respectively with at least one display element of each row of display elements of the first plurality of rows of display elements.

* * * * *